Oct. 16, 1956     R. L. BERG     2,766,863
DIRECTION-CONTROLLING MEANS FOR ELECTRIC
SYNCHRONOUS MOTORS
Filed Feb. 10, 1955
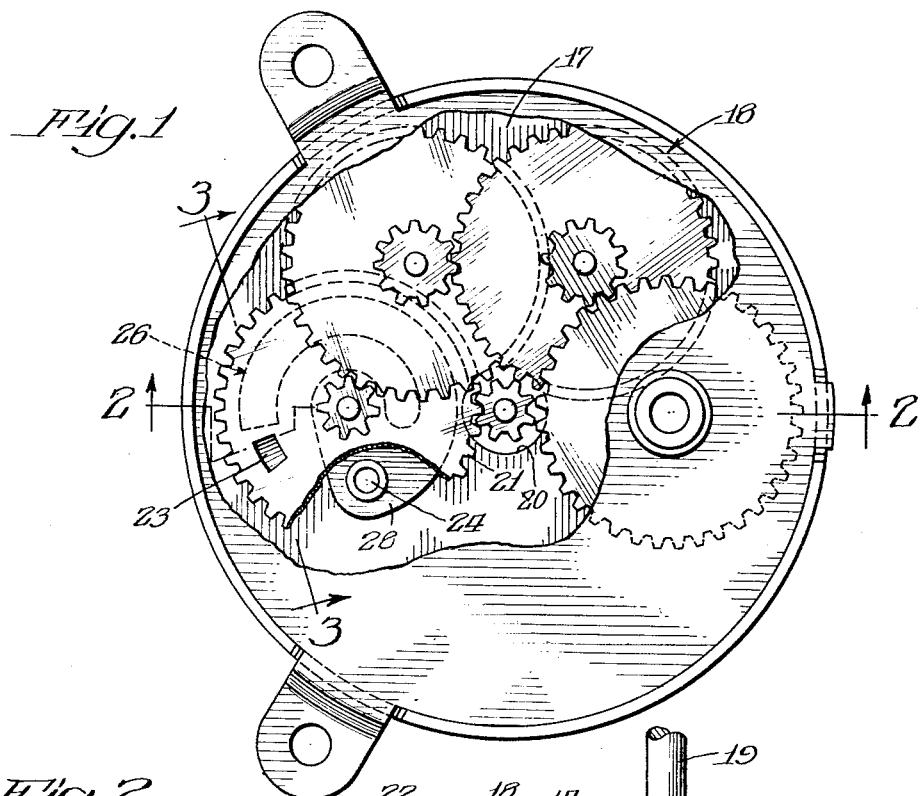
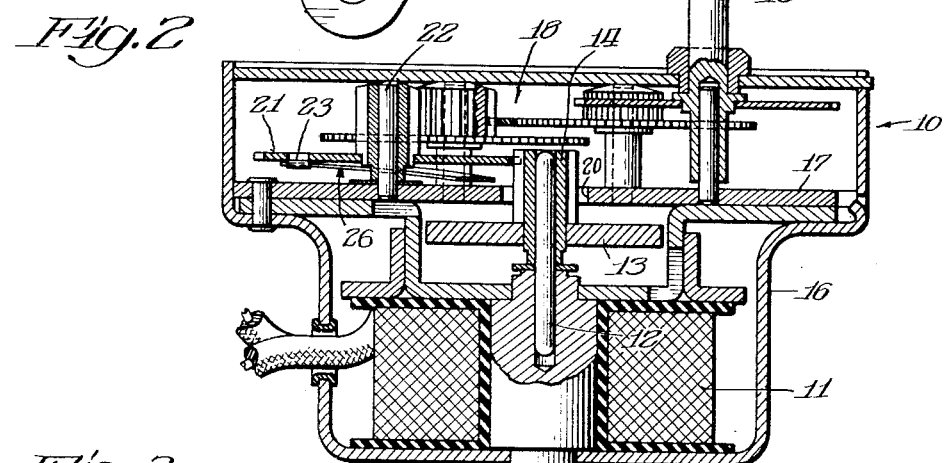
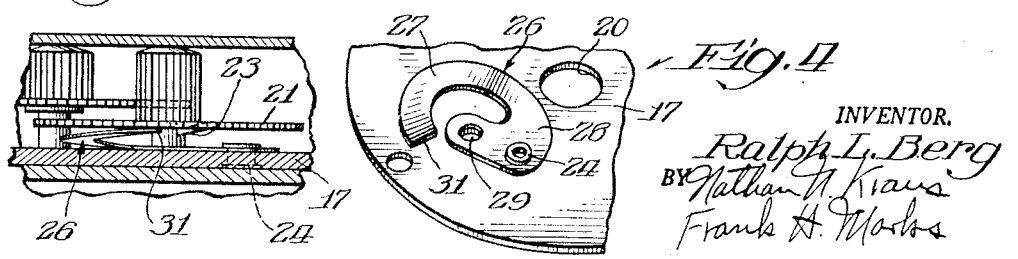
INVENTOR.
Ralph L. Berg
BY Nathan N. Kraus
Frank H. Marks
ATTYS

United States Patent Office 2,766,863
Patented Oct. 16, 1956

2,766,863

DIRECTION-CONTROLLING MEANS FOR ELECTRIC SYNCHRONOUS MOTORS

Ralph L. Berg, Westchester, Ill., assignor, by mesne assignments, to Controls Company of America, Schiller Park, Ill., a corporation of Delaware Application February 10, 1955, Serial No. 487,384

7 Claims. (Cl. 192—4)

My invention relates to direction-controlling means for use on self-starting electric synchronous motors of the type which, if not prevented from doing so, may start in either direction of rotation.

One of the objects of my invention is the provision of improved means for ensuring that rotation of the rotor shall occur always in one direction only.

Another object of my invention is the provision of improved means affording a rebound to the rotor of a synchronous motor to initiate a reverse direction of rotation should the rotor start in the wrong direction.

A further object of my invention is to ensure the desired results by simple means which is not only efficient and reliable in operation but is rugged and durable in service.

Other and further objects and advantages of my invention will become apparent from the following description when considered in connection with the accompanying drawings, in which—

Fig. 1 is a top plan view of a small synchronous motor embodying the present invention, with certain parts broken away to disclose certain structural features;

Fig. 2 is a cross-sectional view taken substantially on line 2—2 of Fig. 1;

Fig. 3 is a cross-sectional view taken substantially on line 3—3 of Fig. 1; and

Fig. 4 is a fragmentary perspective view of the control element.

Referring to the drawings, numeral 10 indicates generally a conventional self-starting synchronous motor comprising a stator 11, a rotor shaft 12 carrying a permanent magnet rotor 13 on which is fixed a driving pinion 14. The stator and rotor are contained within a housing shell 16 which includes a dividing plate 17 provided with a central aperture 20 through which the driving pinion projects. This type of motor is reliably self-starting and, when energized, the rotor immediately rotates in synchronism, but may start in either direction of rotation. Accordingly, the rotation direction-controlling means of my invention is provided so that the rotor 13 may operate only in one direction to drive a timing mechanism or other apparatus. When blocked from rotation in one direction, the motor will immediately start in the opposite or required direction.

The driving pinion 14 is operatively connected with a train of conventional speed-reducing gears indicated generally by 18 and operatively connected to a driven shaft 19. The first gear 21 of the train is mounted on a shaft 22 fixed in the plate 17 and is provided on its underside with a struck-out abutment 23 intermediate its axis and the peripheral edge thereof.

Secured to the plate 17, as by a rivet 24, is a control member 26 formed of thin sheet resilient metal and shaped substantially as illustrated in Fig. 4. As will be seen, the member 26 includes a semi-circular arcuate portion 27 having a radius of curvature corresponding substantially to the radial distance from which the abutment is located relative to the center of the gear 21. The base portion 28 of the member 26 is provided with an aperture 29 which is adapted to receive the shaft 22 fixed in the plate, thereby in effect providing a two-point securement to prevent pivotal movement of the member 26. The arcuate portion 27 is substantially a half-turn of a flat helix, the free end 31 of which is substantially parallel to the plane of the side of the gear 21 and is arranged in registration with the abutment 23 of the gear 21, so that the said end may engage with the abutment. As seen clearly in Fig. 3, the abutment is gradually inclined away from its point of juncture with the gear and is caused to wipe over the end 31 of the spring when the gear is rotating in counter-clockwise direction, which corresponds to the correct direction of rotation for the rotor. The pressure of the member 26 against the underside of the gear 21 is very slight, and only the extreme end 31 of the member actually engages the underside of the gear, thereby minimizing any frictional drag that might develop between the parts.

The operation of my invention should be apparent from the foregoing description, but briefly stated it is as follows:

When the stator 11 is energized, the rotor 13 begins to turn. If it starts in the wrong direction, the gear 21 will turn never more than one revolution until abutment 23 impacts against the terminal end 31 of the member 26. The said member may be slightly deformed upon impact, but it prevents rotation of the gear 21 and correspondingly blocks rotation of the rotor 13. This structure affords a slightly yielding but positive stop, and results in a rebounding of the gear 21 in a reverse direction sufficiently to initiate smooth running of the rotor in the required direction.

The rebounding action is brought about by the conversion of the kinetic energy of the rotor into potential energy which is stored in the member 26. The said member yields its energy which, in combination with electrical energy effects a reversal in the direction of rotation of the rotor, even though an instantaneous null coincides, thereby preventing the possibility of the rotor coming to rest at a dead spot, which would prevent rotation of the rotor.

Various changes and modifications coming within the spirit of my invention will doubtless suggest themselves to those skilled in the art. Hence, I do not wish to be limited to the specific form shown or uses mentioned.

I claim:

1. In combination a self starting synchronous motor having a pinion on the rotor thereof, a driven gear operatively engaged with said pinion, said gear having an abutment on one side thereof, a resilient member formed of relatively thin sheet metal and comprising a section of helix, said resilient member being fixed at one end, the other end of resilient member being free, the free end of said resilient member being adapted to engage said abutment according to one direction of rotation of said gear to arrest the movement thereof in said one direction of rotation, said resilient member lying wholly within the projected circular area of said gear, said resilient member affording a slightly resilient but positive stop which when impacted by said abutment effects a rebound of said abutment and said gear to change the direction of rotation of the same thereby to establish rotation in a desired direction.

2. In combination a self starting synchronous motor having a pinion on the rotor thereof, a driven gear operatively engaged with said pinion, said gear having a pitch diameter greater than the pitch diameter of said pinion to effect reduction in speed of said rotor, a resilient member formed of relatively thin sheet metal and comprising a section of helix, said resilient member being fixed at one end, the other end of said resilient member being free, said resilient member lying wholly within the projected circular area of said gear, said gear having an abutment at one side thereof, the free end of said member being adapted to engage said abutment according to one direction of rotation of said gear to arrest the movement thereof in said one direction of rotation, said resilient member affording a slightly resilient but positive stop which when impacted by said abutment effects a rebound of said abutment and said gear to change the direction of rotation of the same thereby to establish rotation in a desired direction.

3. In combination a self-starting synchronous motor having a pinion on the rotor thereof, a driven gear operatively engaged with said pinion, said gear having an abutment on one side thereof, a resilient member being formed of relatively thin sheet metal and being substantially arcuate in form with one end fixed and the other end bent away and disposed in a plane spaced from said fixed end, said other end being free and being adapted to engage said abutment according to one direction of rotation of said gear to arrest the movement thereof in said one direction of rotation, said resilient member lying wholly within the projected circular area of said gear, said resilient member affording a slightly resilient but positive stop which when impacted by said abutment effects a rebound of said abutment and said gear to change the direction of rotation of the same thereby to establish rotation in a desired direction.

4. The invention as defined in claim 1 in which the arcuate resilient member is substantially concentric with said driven gear.

5. In combination a self starting synchronous motor having a housing shell including a plate having an aperture therein and a rotor shaft aligned with said aperture, a pinion fixed on said shaft and at least a portion of said pinion extending through said aperture, a driven gear operatively engaged with said pinion, said gear having an inner side face arranged in spaced confronting relation to the outer face of said plate, one of said faces having an abutment thereon, a resilient member formed of relatively thin sheet metal and comprising a section of a helix, said resilient member being fixed at one end to the other of said faces, the other end of said resilient member being free and being adapted to engage said abutment according to one direction of rotation of said gear to arrest the movement thereof in said one direction of rotation, said resilient member lying wholly within the projected circular area of said gear, said resilient member affording a slightly resilient but positive stop which when impacted by said abutment effects a rebound of said abutment and said gear to change the direction of rotation of the same thereby to establish rotation in a desired direction.

6. In combination a self starting synchronous motor having a housing shell including a plate having an aperture therein and a rotor shaft aligned with said aperture, a pinion fixed on said shaft and at least a portion of said pinion extending through said aperture, a driven gear operatively engaged with said pinion, said gear having a pitch diameter greater than the pitch diameter of said pinion to effect reduction in speed of said rotor, said gear having an inner side face arranged in spaced confronting relation to the outer face of said plate, one of said faces having an abutment thereon, a resilient member formed of relatively thin sheet metal and comprising a section of a helix, said resilient member being fixed at one end to the other of said faces, the other end of said resilient member being free and being adapted to engage said abutment according to one direction of rotation of said gear to arrest the movement thereof in said one direction of rotation, said resilient member lying wholly within the projected circular area of said gear, said resilient member affording a slightly resilient but positive stop which when impacted by said abutment effects a rebound of said abutment and said gear to change the direction of rotation of the same thereby to establish rotation in a desired direction.

7. In combination a self starting synchronous motor having a housing shell including a plate having an aperture therein and a rotor shaft aligned with said aperture, a pinion fixed on said shaft and at least a portion of said pinion extending through said aperture, a driven gear operatively engaged with said pinion, said gear having an inner side face arranged in spaced confronting relation to the outer face of said plate, one of said faces having an abutment thereon, a resilient member formed of relatively thin sheet metal and being substantially arcuate in form with one end fixed to the other of said faces and having the other end bent away and disposed in a plane spaced from said fixed end, said other end being free and being adapted to engage said abutment according to one direction of rotation of said gear to arrest the movement thereof in said one direction of rotation, said resilient member lying wholly within the projected circular area of said gear, said resilient member affording a slightly resilient but positive stop which when impacted by said abutment effects a rebound of said abutment and said gear to change the direction of rotation of the same thereby to establish rotation in a desired direction.

References Cited in the file of this patent

UNITED STATES PATENTS

| | | |
|---|---|---|
| 2,633,950 | Phaneuf | Apr. 7, 1953 |

FOREIGN PATENTS

| | | |
|---|---|---|
| 676,987 | Germany | June 16, 1939 |